United States Patent
Xu et al.

(10) Patent No.: US 10,384,536 B2
(45) Date of Patent: Aug. 20, 2019

(54) POWER COUPLING SYSTEM FOR ELECTRIC VEHICLE, ELECTRIC VEHICLE HAVING THE SAME AND CONTROL METHOD THEREOF

(71) Applicant: NIO NEXTEV LIMITED, Hong Kong (CN)

(72) Inventors: Wenke Xu, Shanghai (CN); Changhong Chen, Shanghai (CN); Bin He, Shanghai (CN)

(73) Assignee: NIO NEXTEV LIMITED, Hong Kong (CN)

( * ) Notice: Subject to any disclaimer, the term of this patent is extended or adjusted under 35 U.S.C. 154(b) by 3 days.

(21) Appl. No.: 15/727,906

(22) Filed: Oct. 9, 2017

(65) Prior Publication Data
US 2018/0099561 A1    Apr. 12, 2018

(30) Foreign Application Priority Data
Oct. 10, 2016    (CN) .......................... 2016 1 0882507

(51) Int. Cl.
*B60K 17/12* (2006.01)
*B60K 1/02* (2006.01)
(Continued)

(52) U.S. Cl.
CPC ................ *B60K 17/12* (2013.01); *B60K 1/02* (2013.01); *B60K 17/08* (2013.01); *B60K 17/16* (2013.01);
(Continued)

(58) Field of Classification Search
None
See application file for complete search history.

(56) References Cited

U.S. PATENT DOCUMENTS 7,367,911 B2 *  5/2008  Raghavan .............. B60K 6/365
                                            180/65.25
7,396,305 B2 *  7/2008  Raghavan ................ B60K 6/40
                                                475/5
(Continued)

FOREIGN PATENT DOCUMENTS

CN    102555791    7/2012
CN    202463569    10/2012
(Continued)

OTHER PUBLICATIONS

International Search Report for International (PCT) Patent Application No. PCT/CN2017/105251, dated Dec. 29, 2017, 5 pages.

*Primary Examiner* — Dirk Wright
(74) *Attorney, Agent, or Firm* — Sheridan Ross P.C.

(57) ABSTRACT

A power coupling system for electric vehicle, an electric vehicle having the same and a control method thereof are provided. Said power coupling system comprises a planet gear transmission mechanism comprising a sun gear, planet gears, a planet carrier and a ring gear, wherein the planet carrier is connected with the planet gears, and the planet gears mesh with the sun gear and the ring gear respectively; a clutch engaged with or disengaged from the ring gear in a controlled way; a main reduction gear set connected to an output shaft of the planet carrier; a differential connected to an output shaft of the main reduction gear set; a first motor for driving an input shaft of the sun gear of the planet gear transmission mechanism; and a second motor which drives the output shaft of the ring gear or the planet carrier in a controlled way.

9 Claims, 1 Drawing Sheet

(51) Int. Cl.
*B60K 17/08* (2006.01)
*B60K 17/16* (2006.01)
*B60L 15/32* (2006.01)
*F16H 3/72* (2006.01)
*F16H 37/08* (2006.01)

(52) U.S. Cl.
CPC .............. *B60L 15/32* (2013.01); *F16H 3/728* (2013.01); *F16H 37/082* (2013.01); *B60Y 2400/73* (2013.01); *F16H 2200/0021* (2013.01)

(56) References Cited

U.S. PATENT DOCUMENTS 7,544,141 B2 *  6/2009  Holmes .................... B60K 6/40
                                                              475/5
2006/0247086 A1   11/2006  Watanabe et al.

FOREIGN PATENT DOCUMENTS

| CN | 105751881   | 7/2016  |
|----|-------------|---------|
| CN | 206336116   | 7/2017  |
| JP | 2005-291477 | 10/2005 |

* cited by examiner

POWER COUPLING SYSTEM FOR ELECTRIC VEHICLE, ELECTRIC VEHICLE HAVING THE SAME AND CONTROL METHOD THEREOF

CROSS-REFERENCE TO RELATED APPLICATION

This application claims the benefit of China Patent Application No. 201610882507.3 filed Oct. 10, 2016, the entire contents of which are incorporated herein by reference.

FIELD OF THE INVENTION

The invention relates to the field of electric vehicle, and more specifically, to a power coupling system for electric vehicle as well as a control method thereof.

BACKGROUND

As the global energy crisis is getting worse and worse, the harm caused by gradually drying up of oil resources, air pollution and global warming is aggravating. Governments of the world and automobile enterprises have commonly recognized that energy saving and emission reduction are the trends of future development of automobile technologies. Electric vehicles are becoming more and more recognized by consumers due to characteristics such as zero emission, low noise, low cost of usage and better economy. Meanwhile, the market share of electric vehicles is increasing year by year. The power systems of existing pure electric vehicles mostly adopt a solution in which a single electric motor cooperates with a transmission having a fixed transmission ratio. However, in practical application, this solution has many deficiencies. On one hand, since a large torque is required when the electric vehicle starts up, a transmission having a larger transmission ratio has to be selected. On the other hand, when the electric vehicle is running at a high speed, a small transmission ratio of the transmission is required; otherwise, a drive motor having a high rotational speed has to be selected. When using a transmission having a fixed transmission ratio, it is very difficult to optimize operating points of the motor so that the motor can always operate in an efficient area, thus affecting the driving range of electric vehicle. For a solution of two-gear or multi-gear transmission, in order to realize uninterrupted power, the control in gear-shifting process is relatively complicated. Meanwhile, consumers have higher and higher requirements on the driving range and the power of electric vehicles. Therefore, nowadays, more and more attention are paid to the coupling solution of dual-motor cooperating with transmission in the field.

As a kind of solution, Chinese patent No. CN201510166465.9 discloses a dual-motor electric vehicle device and an electric vehicle equipped with the same, comprising a first motor, a second motor, a planet gear transmission mechanism, a speed-reducing and torque-increasing device, a differential and a controller, wherein the first motor is coupled to a sun gear, the second motor is coupled to a ring gear, and outputs of the first motor and the second motor are output from a planet carrier after being superimposed on the planet gears. When the vehicle speed is smaller than a preset value, the first motor is in a motor mode and rotates in a forward direction, the second motor rotates in a reverse direction and is in a power generation mode so as to charge on-board battery pack; when the vehicle speed is not smaller than the preset value, both the first motor and the second motor are in the motor mode and rotate in the forward direction. This solution is simple in structure and can realize various operation modes. However, it has the following problem: when the vehicle speed is smaller than the preset value, in addition to driving the vehicle, the first motor also has to drive the second motor to generate power, thus making the overall efficiency not high.

As another kind of solution, Chinese patent No. CN201120535844.8 discloses a dual-motor electric vehicle power assembly system and an electric vehicle equipped with the same, comprising a first planet gear transmission mechanism, a second planet gear transmission mechanism, a connection device connecting the first planet gear transmission mechanism and the second planet gear transmission mechanism, a differential connected with the second planet gear transmission mechanism, a first motor connected with an input sun gear in the first planet gear transmission mechanism, and a second motor connected with a ring gear in the first planet gear transmission mechanism. In the electric traction mode, when the torque demand is smaller than a preset value, a second clutch is engaged so that the input ring gear is fixed and torque is input via the first motor; otherwise, the second clutch is disengaged so that the input ring gear is released, and a first clutch is engaged and torque is output via the two motors. In this solution, although a coupling of rotational speeds of two motors can be realized, the mechanical structure using two rows of planet gears for transmission is relatively complicated.

SUMMARY OF THE INVENTION

An object of the invention is to provide a power coupling system for electric vehicle.

Another object of the invention is to provide an electric vehicle having the power coupling system for electric vehicle.

Further another object of the invention is to provide a control method of the power coupling system for electric vehicle.

According to an aspect of the invention, a power coupling system for electric vehicle is further provided, comprising: a planet gear transmission mechanism, which comprises a sun gear, planet gears, a planet carrier and a ring gear, wherein the planet carrier is connected with the planet gears, and the planet gears mesh with the sun gear and the ring gear respectively; a clutch which is engaged with or disengaged from the ring gear in a controlled way; a main reduction gear set which is connected to an output shaft of the planet carrier; a differential, which is connected to an output shaft of the main reduction gear set; a first motor which drives an input shaft of the sun gear of the planet gear transmission mechanism; and a second motor which drives the output shaft of the ring gear or the planet carrier in a controlled way.

Optionally, the power coupling system for electric vehicle further comprises: a first gear set, a driven gear of which meshes with the ring gear; a second gear set, a driven gear of which is connected with the output shaft of the planet carrier; and a synchronizer, which is driven by the second motor and can move among a first engagement position, a second engagement position and a disengagement position; wherein in the first engagement position, the synchronizer is engaged with the first gear set, and at this point, the second motor drives the ring gear; in the second engagement position, the synchronizer is engaged with the second gear set, and at this point, the second motor drives the output shaft of the planet carrier; and in the disengagement position, the synchronizer does not engage with the first gear set or the second gear set.

Optionally, the power coupling system for electric vehicle further comprises a third gear set, and the second motor drives an input shaft of the third gear set; drive gears of the first gear set and the second gear set are sleeved over the output shaft of the third gear set in idle form respectively; wherein when the synchronizer is moved to the first engagement position, the drive gear of the first gear set is connected with the output shaft of the third gear set; and when the synchronizer is moved to the second engagement position, the drive gear of the second gear set is connected with the output shaft of the third gear set.

Optionally, the drive gear of the main reduction gear set is connected to the output shaft of the planet carrier, and the driven gear of the main reduction gear set is connected to the differential.

Optionally, the first motor has a higher power than the second motor, and the second motor has a larger rotational speed than the first motor.

According to another aspect of the invention, an electric vehicle is further provided, which comprises the above described power coupling system for electric vehicle, and wheels connected to the differential via half axles.

According to further another aspect of the invention, a control method of electric vehicle comprising the above described electric vehicle is further provided, the control method comprising: a rotational speed coupling mode, in which the first motor drives the input shaft of the sun gear of the planet gear transmission mechanism, the second motor drives the ring gear of the planet gear transmission mechanism, and the torque is transmitted to the wheels via the output shaft of the planet carrier of the planet gear transmission mechanism, the main reduction gear set and the differential in sequence; and/or a torque coupling mode, in which the first motor drives the input shaft of the sun gear of the planet gear transmission mechanism, the second motor drives the output shaft of the planet carrier in a controlled way, and the first motor transmits torque to the output shaft of the planet carrier, which is coupled with the torque transmitted by the second motor and is then transmitted to the wheels via the main reduction gear set and the differential; and/or an independent operation mode of the first motor, in which the first motor drives the input shaft of the sun gear of the planet gear transmission mechanism, and torque is transmitted to the wheels via the output shaft of the planet carrier of the planet gear transmission mechanism, the main reduction gear set and the differential in sequence.

Optionally, in the rotational speed coupling mode, the first motor and the second motor are activated, the clutch is disengaged from the ring gear, and the synchronizer is moved to the first engagement position so that the second motor is connected with the ring gear; and/or in the torque coupling mode, the first motor and the second motor are activated, the clutch is engaged with the ring gear, and the synchronizer is moved to the second engagement position so that the second motor is connected with the output shaft of the planet carrier; and/or in the independent operation mode of the first motor, the first motor is activated and the second motor is deactivated, the clutch is engaged with the ring gear, and the synchronizer is moved to the disengagement position so that the second motor is disconnected.

Optionally, in the rotational speed coupling mode, when a brake pedal is moved to a braking position, the first motor and/or the second motor enter the power generation mode; and/or in the torque coupling mode, when the brake pedal is moved to the braking position, the first motor and/or the second motor enter the power generation mode; and/or in the independent operation mode of the first motor, when the brake pedal is moved to the braking position, the first motor enters the power generation mode.

Optionally, a mutual switch between the rotational speed coupling mode and the torque coupling mode can be realized through the independent operation mode of the first motor.

The power coupling system for electric vehicle and the electric vehicle of the invention enable different operation modes to be used in different operational situations, thus meeting different requirements on the motor power or rotational speed or the like, and greatly improving the applicability of the electric vehicle. For example, when starting the vehicle on a flat road at a low speed, the system can be controlled to enter the independent operation mode of the first motor so that the performance of the first motor can be made full use of. For another example, during cruise driving or high speed driving, the system can be controlled to enter the rotational speed coupling mode, and rotational speed coupling of the two motors can be realized through the planet gear structure; through a stepless speed regulation conducted by the second motor, the first motor can operate in an efficient area, thus improving the economy and increasing driving range. For further another example, when there is a large torque requirement, the control system can be controlled to enter the torque coupling mode so as to achieve better acceleration performance and climbing performance, etc.

DETAILED DESCRIPTION OF THE INVENTION

Figure 1:
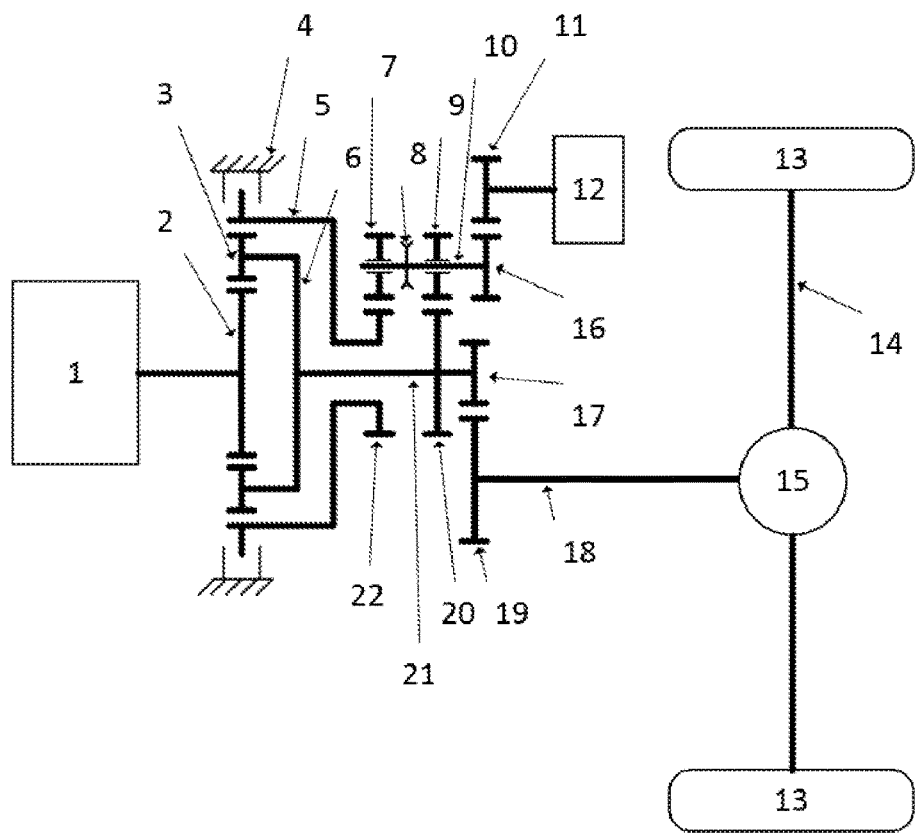
FIG. 1 is a schematic view of an embodiment of the power coupling system for electric vehicle of the invention.

FIG. 1 shows a schematic view of an embodiment of the present power coupling system for electric vehicle. Specifically, the power coupling system for electric vehicle of this embodiment comprises: a first motor 1, a sun gear 2, planet gears 3, a clutch 4, a ring gear 5, a planet carrier 6, a drive gear 7 of a first gear set, a synchronizer 8, a drive gear 9 of a second gear set, an input shaft 10, a drive gear 11 of a third gear set, a second motor 12, wheels 13, half axles 14, a differential 15, a driven gear 16 of the third gear set, a drive gear 17 of a main reduction gear set, an output shaft 18, a driven gear 19 of the main reduction gear set, a driven gear 20 of the second gear set, an output shaft 21, and a driven gear 22 of the first gear set. In this system, different motors can be used to drive different elements of the system by controlling the activation and deactivation of the first motor 1 and the second motor 12, the engagement and disengagement of the clutch 4 and the synchronized position of the synchronizer 8, thereby realizing various operation modes of torque coupling, rotational speed coupling and independent operation of the first motor or the like so as to adapt to different working conditions respectively.

The sun gear 2, the planet gears 3, the ring gear 5 and the planet carrier 6 constitute a planet gear transmission mechanism, and the planet gears 3 comprise four gears evenly arranged along the circumference of the planet carrier 6, wherein the number of the planet gears 3 is not limited to four. The planet gears 3 mesh with an outer edge of the sun gear 2 and an inner edge of the ring 5 simultaneously. The planet carrier 6 is fixedly connected with the output shaft 21. The output shaft 21 is fixedly connected with the drive gear 17 of the main reduction gear set. The drive gear 17 of the main reduction gear set meshes with the driven gear 19 of the main reduction gear set so as to serve for reducing the speed and increasing the torque. The driven gear 19 of the main reduction gear set is fixedly connected with the output shaft 18. The output shaft 18 outputs the power to the wheels via the differential 15 and right and left half axles 14.

As one of the power sources, the motor output shaft of the first motor 1 is fixedly connected with the sun gear 2 so that the wheels 13 can be driven via the sun gear 2, the planet gears 3, an output shaft 21 of the planet carrier 6, the drive gear 17, the driven gear 19, the output shaft 18, the differential 15 and the half axles 14.

As another one of the power sources, the motor output shaft of the second motor 12 is fixedly connected with the drive gear 11 of the third gear set, the drive gear 11 of the third gear set meshes with the driven gear 16 of the third gear set. The driven gear 16 of the third gear set is fixedly connected with the input shaft 10. The drive idle gear 7 of the first gear set and the drive idle gear 9 of the second gear set are sleeved over the input shaft 10. The drive gear 7 of the first gear set and the driven gear 22 mesh with each other and form a gear pair. The drive gear 9 of the second gear set and the driven gear 20 mesh with each other and form a gear pair. The synchronizer 8 can move to different positions on the input shaft 10 in a leftward and rightward direction: when the synchronizer 8 moves leftward to a first engagement position, it engages with the drive gear 7 of the first gear set so as to further realize engagement of the drive gear 7 of the first gear set with the input shaft 10; when the synchronizer 8 moves rightward to a second engagement position, it engages with the drive gear 9 of the second gear set so as to further realize engagement of the drive gear 9 of the second gear set with the input shaft 10; and when the synchronizer 8 moves to an intermediate disengagement position, neither of the drive gear 7 of the first gear set nor the drive gear 9 of the second gear set engages with the input shaft 10.

Optionally, the first motor 1 is the main motor which has a higher power and rotational speed, and the second motor 12 is an auxiliary motor which employs a high speed motor having a lower power. More specifically, the first motor 1 has a higher power than the second motor 12, and the second motor 12 has a larger rotational speed than the first motor 1.

Figure 2:
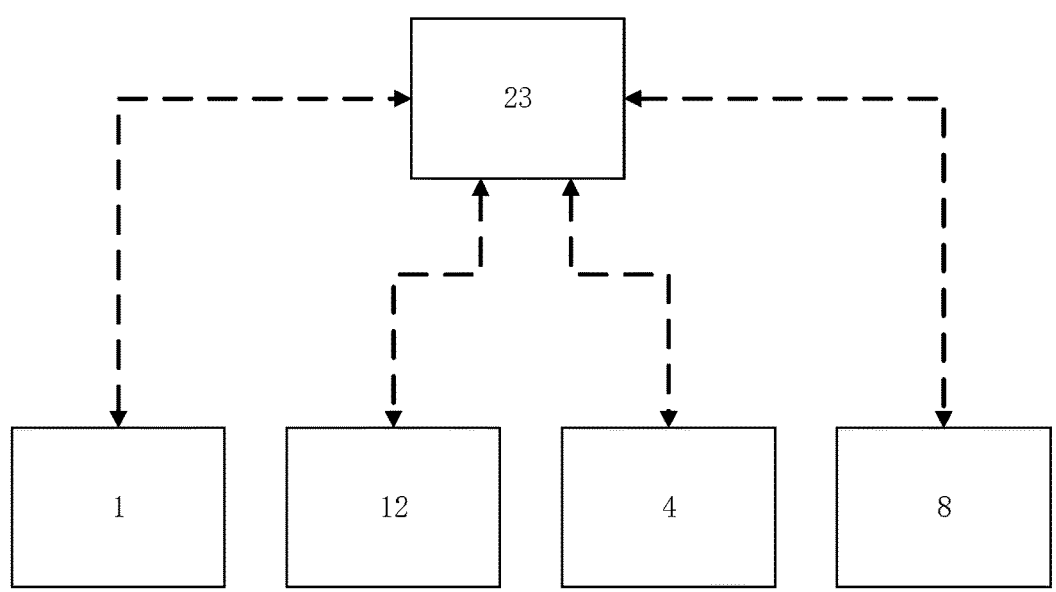
FIG. 2 is a schematic view of an embodiment of the control system of the invention.

FIG. 2 is a schematic view showing the electrical connection of an embodiment of the power coupling system for electric vehicle of the invention. The system further comprises a controller 23 which can be communicatively connected to the first motor 1, the second motor 12, the clutch 4 and the synchronizer 8 respectively so as to realize control of the entire vehicle. The controller 23 can determine the specific operation mode of the electric vehicle according to input signals of the brake pedal, the acceleration pedal and various sensors conventionally disposed in the electric vehicle, and based on the specific conditions of various operation modes, can control the activation and deactivation of the first motor 1 and the second motor 12, engagement/disengagement of the clutch 4, and movement of the position of the synchronizer 8. Thereby, the independent operation mode of the first motor 1, the rotational speed coupling mode and the torque coupling mode of two motors are realized.

The several operation modes will be further described below:

When the independent operation mode of the first motor is executed, the controller 23 controls the first motor to activate and the second motor to deactivate, controls the clutch 4 to engage with the ring gear 5, and controls the synchronizer 8 to move to the disengagement position. At this point, the planet gears 3 have only one degree of freedom. The first motor 1 inputs torque via the sun gear 2, and outputs the torque via the planet carrier 6. Further, the wheels 3 are driven via the output shaft 21, the drive gear 17 of the main reduction gear set, the driven gear 19 of the main reduction gear set, the output shaft 18, the differential 15 and half axles 14. Moreover, the controller 23 controls the synchronizer 8 to move to the disengagement position. At this point, both the drive gear 7 of the first gear set and the drive gear 9 of the second gear set are disengaged from the input shaft 10, so they can not transmit the torque from the second motor 12. The second motor 12 is deactivated.

In the independent operation mode of the first motor, when the first motor 1 is in an electric motor state, it can be used for working conditions such as starting up on a flat road.

Further, if the brake pedal is pressed so as to brake the vehicle, the first motor 1 will be in a power generation state so as to charge the battery. This operation can be used for recovering braking energy.

Furthermore, when the electric vehicle is in a reverse gear, the first motor 1 operates independently, the clutch 4 engages with the ring gear 5, and the synchronizer 8 is moved to the disengagement position so as to be disengaged from both the drive gear 7 of the first gear set and the drive gear 9 of the second gear set. Moreover, the first motor 1 rotates in the reserve direction so that the reverse gear mode can be realized.

When the rotational speed coupling mode is executed, the controller 23 controls the first motor and the second motor to activate, controls the clutch 4 to be disengaged from the ring gear 5, and controls the synchronizer 8 to move leftward to the first engagement position. The synchronizer 8 engages with the drive gear 7 of the first gear set so that the input shaft 10 engages with the drive gear 7 of the first gear set. Since the drive gear 7 of the first gear set meshes with the driven gear 22, the driven gear 22 drives the ring gear 5. At this point, the ring gear 5 will be driven by the second motor 12. At the same time, the sun gear 2 is driven by the first motor 1. Therefore, the rotational speed coupling of the first motor 1 and the second motor 12 can be realized through the planet gear mechanism.

In this mode, the rotational speed of the first motor 1 is $n_1$, the rotational speed of the second motor 12 is $n_2$, the number of teeth of the sun gear is $Z_1$, the number of teeth of the ring gear is $Z_2$, a transmission ratio of the drive gear 7 of the first gear set and the driven gear 22 $i_1$, a transmission ratio of the drive gear 11 of the third gear set and the driven gear 16 of the third gear set is $i_3$, and then the output rotational speed of the output shaft 21 is:

$$n_{out}=[n_1+(K*n_2)/(i_1*i_3)]/(1+K);$$

wherein $K=Z_2/Z_1$.

At this point, a stepless speed change can be realized through the modulation of the rotational speed of the second motor 12 so that the first motor 1 operates in an efficient area for increasing driving range, which is mainly used for cruise driving and high speed driving conditions.

Further, when the electric vehicle is running in the rotational speed coupling mode and the brake pedal is pressed, the controller 23 can control the first motor 1 and the second motor 12 to generate electric power according to the actual working condition of the battery so that the battery can be charged. This operation can be used for recovering braking energy. For example, the input power is transmitted through the output shaft 18, the driven gear 19 of the main reduction gear set, the drive gear 17 of the main reduction gear set, the output shaft 21 and the planet carrier 6, and then in one path transmitted to the sun gear 2 so as to drive the first motor 1 to generate power, and in another path transmitted through the ring gear 5, the driven gear 22, the drive gear 7 of the first gear set, the driven gear 16 of the third gear set to the drive gear 11 of the third gear set so as to drive the second motor 12 to generate power. In this way, charging the battery with two motors is realized.

When the torque coupling mode is executed, the controller 23 controls the first motor and the second motor to activate, controls the clutch 4 to engage with the ring gear 5, and controls the synchronizer 8 to move rightward to the second engagement position. The synchronizer 8 engages with the drive gear 9 of the second gear set so that the input shaft 10 engages with the drive gear 9 of the second gear set. Through the engagement of the drive gear 9 of the second gear set and the driven gear 20, the second motor 12 drives the output shaft 21. At the same time, the first motor 1 drives the output shaft 21 by outputting torque from the planet carrier 6 via the sun gear 2. Further, the first motor 1 and the second motor 12 realize the torque coupling mode on the output shaft 21.

In this mode, the output torque of the first motor 1 is $T_1$, the output torque of the second motor is $T_2$, a transmission ratio of the drive gear 11 of the third gear set and the driven gear 16 of the third gear set is $i_3$, a transmission ratio of the drive gear 9 of the second gear set and the driven gear 20 is $i_2$, and then the output torque of the output shaft 21 is:

$$T_{out}=T_1*(1+K)+T_2*i_3*i_2.$$

At this point, a large torque requirement of the electric vehicle can be met. This large torque operation is mainly used for a rapid acceleration working condition or a climbing working condition.

Further, when the electric vehicle is running in the torque coupling mode and the brake pedal is pressed, the controller 23 can control the first motor 1 and the second motor 12 to generate electric power according to the actual working condition of the battery so that the battery can be charged. This operation can be used for recovering braking energy. For example, the input power is transmitted through the output shaft 18, the driven gear 19 of the main reduction gear set, the drive gear 17 of the main reduction gear set, the output shaft 21 and then in one path transmitted through the planet carrier 6 to the sun gear 2 so as to drive the first motor 1 to generate power, and in another path transmitted through the driven gear 20, the drive gear 9 of the second gear set, the driven gear 16 of the third gear set to the drive gear 11 of the third gear set so as to drive the second motor 12 to generate power. In this way, charging the battery with two motors is realized.

In a switching process among the above three operation modes, the independent operation mode of the first motor has to be gone thorough in a transition from the rotational speed coupling mode to the torque coupling mode. Specifically, when a transition is made from the rotational speed coupling mode to the independent operation mode of the first motor, the second motor 12 is unloaded, and the synchronizer 8 is disengaged from the drive gear 7 of the first gear set so that the drive gear 7 of the first gear set is idling; meanwhile, the clutch 4 engages with the ring gear 5. At this point, the power is input from the first motor 1, and is output via the sun gear 2, the planet carrier 6 and the output shaft 21. When a transition is made from the independent operation mode of the first motor to the torque coupling mode, the controller 23 adjusts the rotational speed of the second motor 12; and when the rotational speed $n_2$ is equal to a product of the rotational speed $n_{21}$ of the output shaft 21, the transmission ratio $i_3$ of the drive gear 11 of the third gear set and the driven gear 16 of the third gear set, and the transmission ratio $i_2$ of the drive gear 9 of the second gear set and the driven gear 20 of the second gear set, i.e., $$n_2=n_{21}*i_2*i_3$$

if they are not equal, an adjustment torque $T=I*(dw/dt)$ is applied to the second motor 12, wherein I is the moment of inertia of the rotating component of the second motor 12, and $dw=n_{21}*i_2*i_3-n_2$ is a rotational speed difference between them. When the two rotational speeds are equal, the torque of the second motor is unloaded. When the torque is 0, the synchronizer 8 engages with the drive gear 9 of the second gear set so that the input shaft 10 is connected with the drive gear 9 of the second gear set, and the rotational speed of the output shaft 21 is obtained from the controller 3 by dividing the current rotational speed of the first motor 1 by $(1+Z_2/Z_1)$. At this point, the power is provided by the first motor 1 and the second motor 12 respectively so that that torque coupling mode is realized. The transmission path of the first motor 1 is not changed, and the power output from the second motor 12 is output via the drive gear 11 of the third gear set, the driven gear 16 of the third gear set, the drive gear 9 of the second gear set, the driven gear 20 and the output shaft 21, and drives the wheels 13 via the drive gear 17 of the main reduction gear set, the driven gear 19 of the main reduction gear set, the output shaft 18, the differential 15 and the half axles 14.

The independent operation mode of the first motor 1 has also to be gone thorough in a transition from the torque coupling mode to the rotational speed coupling mode. Specifically, when a transition is made from the torque coupling mode to the independent operation mode of the first motor 1, the torque of the second motor 12 is firstly unloaded. The synchronizer 8 is disengaged from the drive gear 9 of the second gear set so that the drive gear 9 of the second gear set is idling; meanwhile, the clutch 4 still engages with the ring gear 5. At this point, the power is input from the first motor 1, and is output via the sun gear 2, the planet carrier 6 and the output shaft 21. When a transition is made from the independent operation mode of the first motor 1 to the rotational speed coupling mode, the controller 23 set the rotational speed of the second motor 12 to be 0, and the synchronizer 8 engages with the drive gear 7 of the first gear set so that the output shaft 10 is connected with the drive gear 7 of the first gear set; meanwhile, the clutch 4 is disengaged from the ring gear 5, and the controller 23 controls the output of the second motor 12. At this point, the output of the first motor 1 is provided to the sun gear 2, and the output of the second motor 12 is transmitted through the input shaft 10, the drive gear 7 of the first gear set, the driven gear 22 and the ring gear 5 so as to realize rotational speed coupling, is output via the planet carrier 6 and the output shaft 21, and then drives the wheels 13 via the drive gear 17 of the main reduction gear set, the driven gear 19 of the main reduction gear set, the output shaft 18, the differential 15 and the half axles 14.

When a transition is made from the independent operation mode of the first motor 1 to the torque coupling mode or the rotational speed coupling mode respectively, reference can be also made to the above processes, and therefore a repeated description is not given herein.

To sum up, in a switch transition between different modes, the controller realizes the non-power interruption effect during the switch process by adjusting the rotational speed of the second motor and through a cooperating operation of the synchronizer and the clutch.

The above examples mainly describe the power coupling system for electric vehicle, the electric vehicle having the same and a control method thereof of the invention. While only some of the embodiments of the invention have been described, those skilled in the art will understand that the invention can be carried out in many other forms without departing from the spirit and scope thereof. Therefore, the illustrated examples and embodiments should be considered as illustrative rather than limiting, and the invention can cover various modifications and replacements without departing from the spirit and scope of the invention defined by individual appended claims.

What is claimed is:

1. A power coupling system for electric vehicle, comprising:
    a planet gear transmission mechanism, which comprises a sun gear, planet gears, a planet carrier and a ring gear, wherein the planet carrier is connected with the planet gears, and the planet gears mesh with the sun gear and the ring gear respectively;
    a clutch which is engaged with or disengaged from the ring gear in a controlled way;
    a main reduction gear set which is connected to an output shaft of the planet carrier;
    a differential, which is connected to an output shaft of the main reduction gear set;
    a first motor which drives an input shaft of the sun gear of the planet gear transmission mechanism; and
    a second motor which drives the output shaft of the ring gear or the planet carrier in a controlled way, wherein the first motor has a higher power than the second motor, and the second motor has a larger rotational speed than the first motor.

2. The power coupling system for electric vehicle according to claim 1, further comprising:
    a first gear set, a driven gear of which meshes with the ring gear;
    a second gear set, a driven gear of which is connected with the output shaft of the planet carrier; and
    a synchronizer, which is driven by the second motor and can move among a first engagement position, a second engagement position and a disengagement position;
    wherein in the first engagement position, the synchronizer is engaged with the first gear set, and at this point, the second motor drives the ring gear; in the second engagement position, the synchronizer is engaged with the second gear set, and at this point, the second motor drives the output shaft of the planet carrier; and in the disengagement position, the synchronizer does not engage with the first gear set or the second gear set.

3. The power coupling system for electric vehicle according to claim 2, further comprising:
    a third gear set, and the second motor drives an input shaft of the third gear set;
    drive idle gears of the first gear set and the second gear set are sleeved over an output shaft of the third gear set respectively;
    wherein when the synchronizer is moved to the first engagement position, the driven gear of the first gear set is connected with the output shaft of the third gear set; and when the synchronizer is moved to the second engagement position, the driven gear of the second gear set is connected with the output shaft of the third gear set.

4. The power coupling system for electric vehicle according to claim 1, wherein a drive gear of the main reduction gear set is connected to the output shaft of the planet carrier, and the driven gear of the main reduction gear set is connected to the differential.

5. An electric vehicle, comprising the power coupling system for electric vehicle according to claim 1, and wheels connected to the differential via half axles.

6. A control method for the electric vehicle according to claim 5, the control method comprising:
    a rotational speed coupling mode, in which the first motor drives the input shaft of the sun gear of the planet gear transmission mechanism, the second motor drives the ring gear of the planet gear transmission mechanism, and the torque is transmitted to the wheels via the output shaft of the planet carrier of the planet gear transmission mechanism, the main reduction gear set and the differential in sequence; and/or
    a torque coupling mode, in which the first motor drives the input shaft of the sun gear of the planet gear transmission mechanism, the second motor drives the output shaft of the planet carrier in a controlled way, and the first motor transmits torque to the output shaft of the planet carrier, which is coupled with the torque transmitted by the second motor and is then transmitted to the wheels via the main reduction gear set and the differential; and/or
    an independent operation mode of the first motor, in which the first motor drives the input shaft of the sun gear of the planet gear transmission mechanism, and torque is transmitted to the wheels via the output shaft of the planet carrier of the planet gear transmission mechanism, the main reduction gear set and the differential in sequence.

7. The control method according to claim 6, wherein
    in the rotational speed coupling mode, the first motor and the second motor are activated, the clutch is disengaged from the ring gear, and the synchronizer is moved to the first engagement position so that the second motor is connected with the ring gear; and/or
    in the torque coupling mode, the first motor and the second motor are activated, the clutch is engaged with the ring gear, and the synchronizer is moved to the second engagement position so that the second motor is connected with the output shaft of the planet carrier; and/or
    in the independent operation mode of the first motor, the first motor is activated and the second motor is deactivated, the clutch is engaged with the ring gear, and the synchronizer is moved to the disengagement position so that the second motor is disconnected.

8. The control method according to claim 6, wherein
    in the rotational speed coupling mode, when a brake pedal is moved to a braking position, the first motor and/or the second motor enter the power generation mode; and/or
    in the torque coupling mode, when the brake pedal is moved to the braking position, the first motor and/or the second motor enter the power generation mode; and/or
    in the independent operation mode of the first motor, when the brake pedal is moved to the braking position, the first motor enters the power generation mode.

9. The control method according to claim 6, wherein a mutual switch between the rotational speed coupling mode and the torque coupling mode is realized through the independent operation mode of the first motor.

\* \* \* \* \*